(12) United States Patent
Grimes (10) Patent No.: US 10,173,609 B1
(45) Date of Patent: Jan. 8, 2019

(54) TRUCK TOOLBOX AND COOLER

(71) Applicant: William Grimes, Cedartown, GA (US)

(72) Inventor: William Grimes, Cedartown, GA (US)

( * ) Notice: Subject to any disclaimer, the term of this patent is extended or adjusted under 35 U.S.C. 154(b) by 0 days.

(21) Appl. No.: 15/695,049

(22) Filed: Sep. 5, 2017

(51) Int. Cl.
*B60R 11/06* (2006.01)
*B62D 33/04* (2006.01)
*B62D 33/033* (2006.01)

(52) U.S. Cl.
CPC ............ *B60R 11/06* (2013.01); *B62D 33/033* (2013.01); *B62D 33/048* (2013.01)

(58) Field of Classification Search
CPC ....................................................... B60R 11/06
USPC ........................................................ 296/37.6
See application file for complete search history.

(56) References Cited

U.S. PATENT DOCUMENTS

| 3,664,704 | A | | 5/1972 | Ellis | |
|---|---|---|---|---|---|
| 3,727,971 | A | | 4/1973 | Sisler | |
| D279,664 | S | | 7/1985 | Waters, Jr. | |
| 4,705,317 | A | | 11/1987 | Henri | |
| 4,967,944 | A | * | 11/1990 | Waters | B60R 9/00 224/404 |
| 5,303,969 | A | * | 4/1994 | Simnacher | B60R 11/06 224/494 |
| 5,615,922 | A | * | 4/1997 | Blanchard | B60R 9/02 224/404 |
| 5,848,818 | A | * | 12/1998 | Flueckinger | B60R 9/00 296/37.6 |
| 6,003,923 | A | | 12/1999 | Scott | |
| 2016/0101720 | A1 | | 4/2016 | Anderson | |
| 2017/0349106 | A1 | * | 12/2017 | Zajicek | B60R 11/06 |

* cited by examiner

*Primary Examiner* — Dennis H Pedder
(74) *Attorney, Agent, or Firm* — Kyle A. Fletcher, Esq.

(57) ABSTRACT

The truck toolbox and cooler is a storage chest. The truck toolbox and cooler is configured for use in a vehicle commonly referred to as a pickup truck. The pickup truck is further defined with a bed, a sidewall, and a wheel well. The truck toolbox and cooler is configured to mount by the sidewall of the bed over the wheel well. The truck toolbox and cooler is an insulated structure. The truck toolbox and cooler comprises a thermal shell and a storage insert. The thermal shell forms the insulated exterior shell of the truck toolbox and cooler. The storage insert is a rigid structure stored within the thermal shell. The storage insert converts the interior space of the thermal shell into a space suitable for use in storing hand tools or portable power tools.

18 Claims, 5 Drawing Sheets

TRUCK TOOLBOX AND COOLER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of transportation including vehicles and vehicle fittings, more specifically, an arrangement for holding articles characterized by a position in the vehicle.

SUMMARY OF INVENTION

The truck toolbox and cooler is a storage chest. The truck toolbox and cooler is configured for use in a vehicle commonly referred to as a pickup truck. The pickup truck is further defined with a bed, a sidewall, and a wheel well. The truck toolbox and cooler is configured to mount by the sidewall of the bed over the wheel well. The truck toolbox and cooler is an insulated structure. The truck toolbox and cooler comprises a thermal shell and a storage insert. The thermal shell forms the insulated exterior shell of the truck toolbox and cooler. The storage insert is a rigid structure stored within the thermal shell. The storage insert converts the interior space of the thermal shell into a space suitable for use in storing hand tools or portable power tools.

These together truck toolbox and cooler additional objects, features and advantages of the truck toolbox and cooler will be readily apparent to those of ordinary skill in the art upon reading the following detailed description of the presently preferred, but nonetheless illustrative, embodiments when taken in conjunction with the accompanying drawings.

In this respect, before explaining the current embodiments of the truck toolbox and cooler in detail, it is to be understood that the truck toolbox and cooler is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the truck toolbox and cooler.

It is therefore important that the claims be regarded as including such equivalent construction insofar as they do not depart from the spirit and scope of the truck toolbox and cooler. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
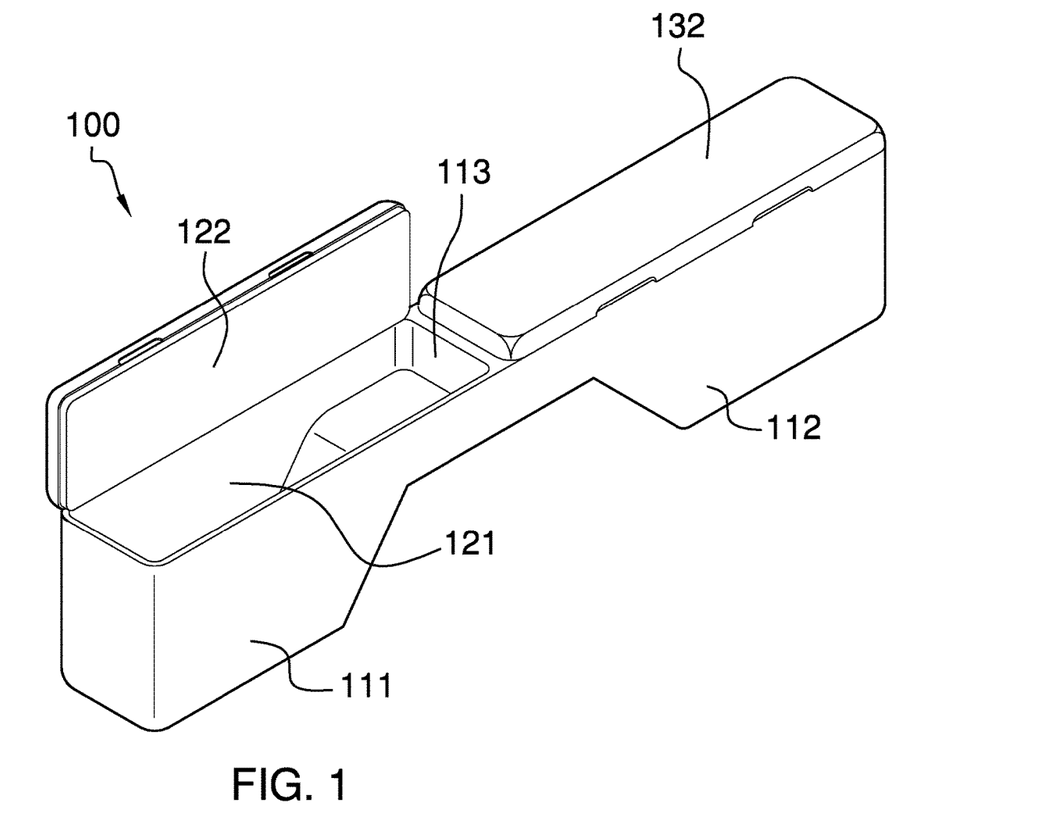
FIG. 1 is a perspective view of an embodiment of the disclosure.
Figure 2:
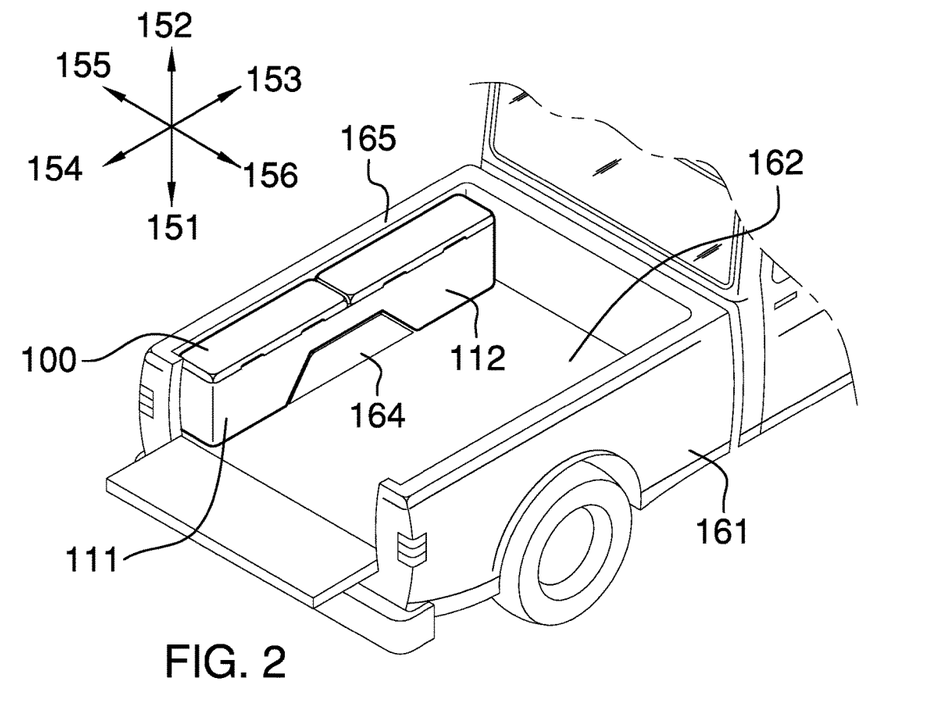
FIG. 2 is an in use view of an embodiment of the disclosure.
Figure 3:
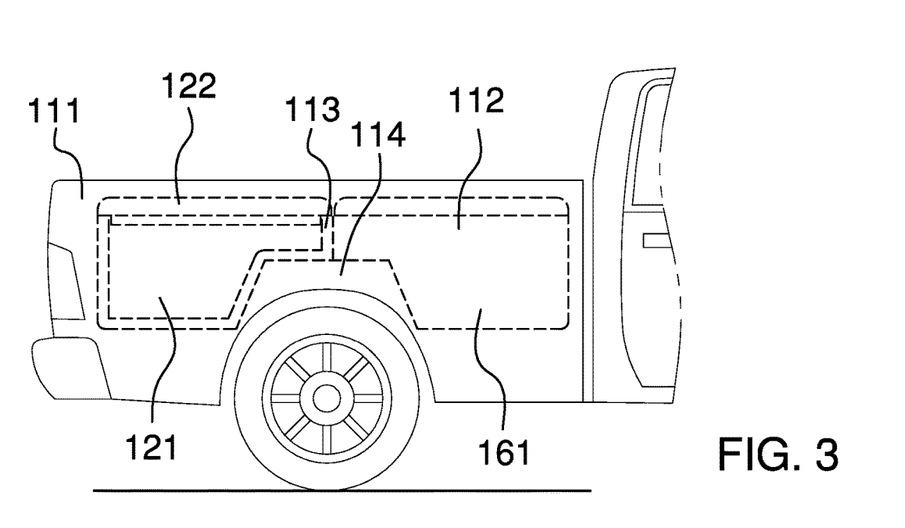
FIG. 3 is a side view of an embodiment of the disclosure.
Figure 4:
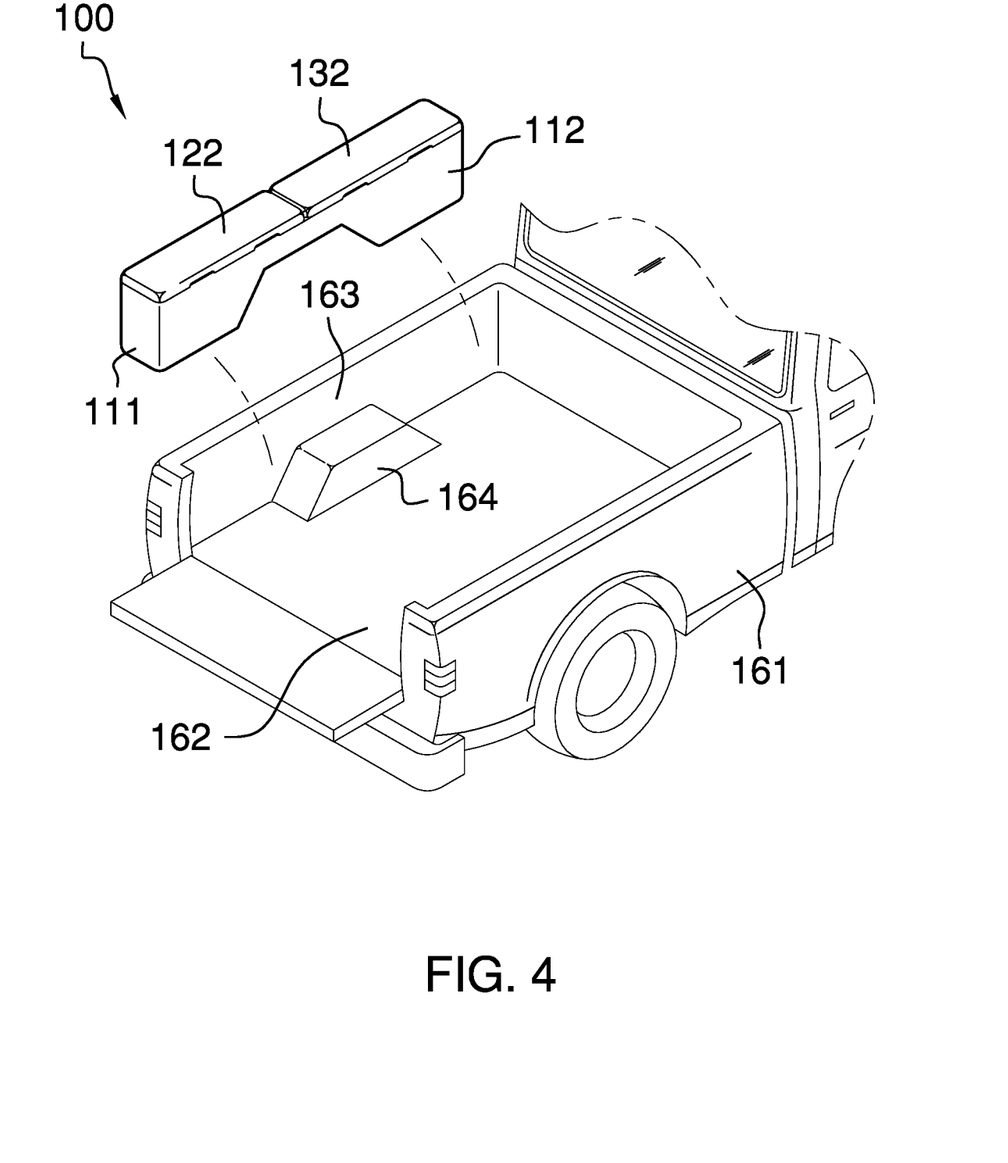
FIG. 4 is an exploded view of an embodiment of the disclosure.
Figure 5:
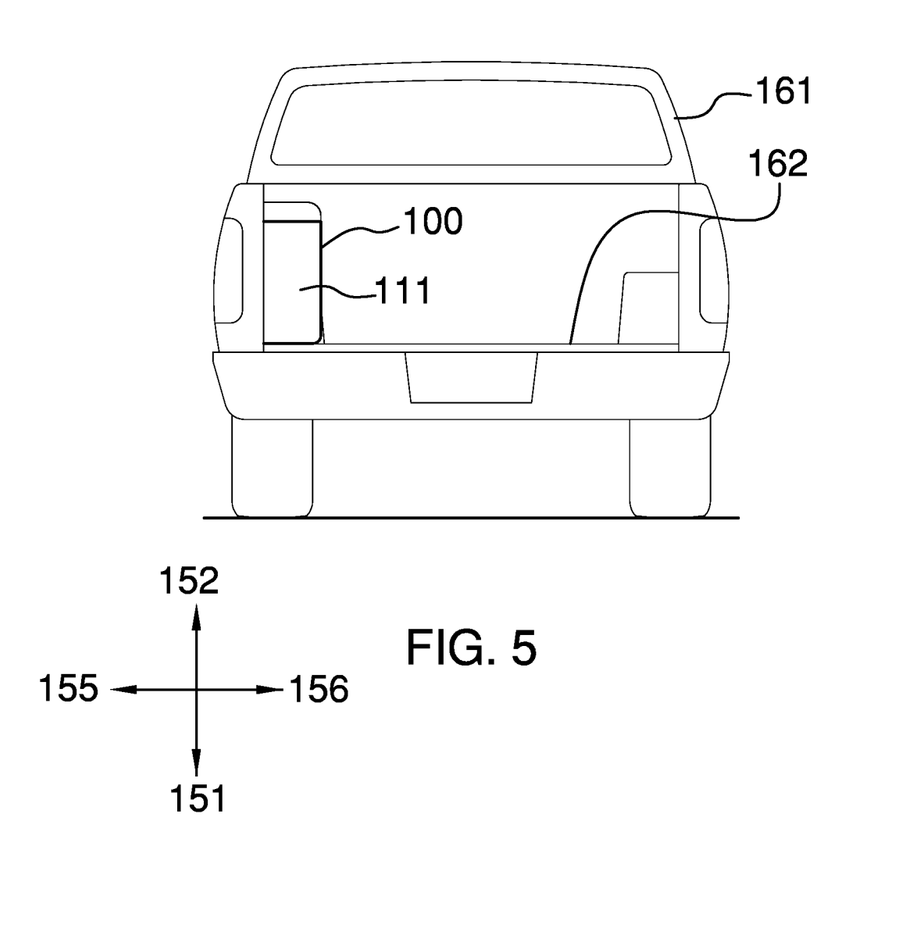
FIG. 5 is a rear view of an embodiment of the disclosure.
Figure 6:
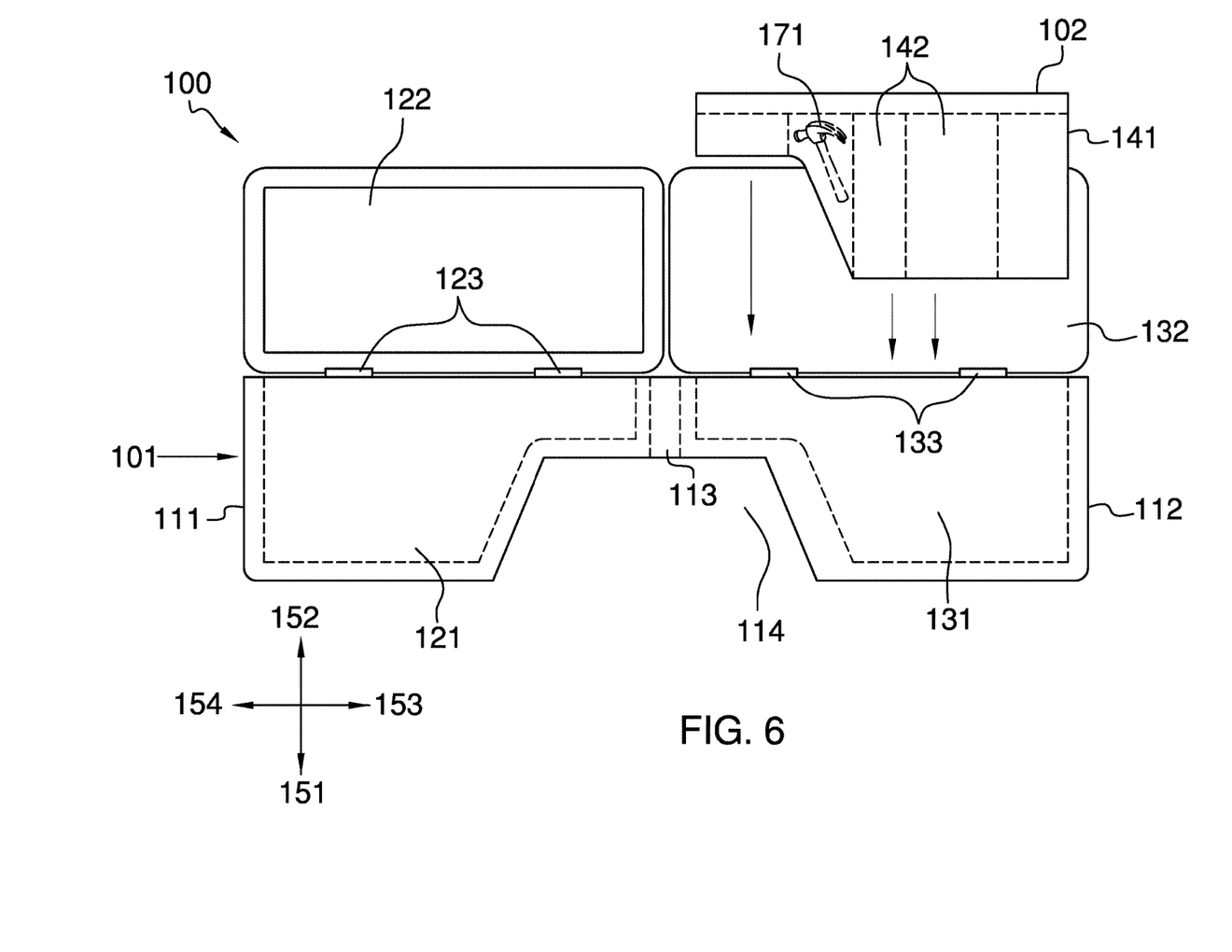
FIG. 6 is a detail view of an embodiment of the disclosure.

Detailed reference will now be made to one or more potential embodiments of the disclosure, which are illustrated in FIGS. 1 through 6.

The truck toolbox and cooler 100 (hereinafter invention) is a storage chest. The invention 100 is configured for use in a vehicle commonly referred to as a pickup truck 161. The pickup truck 161 is further defined with a bed 162, a sidewall 163, and a wheel well 164. The invention 100 is configured to mount by the sidewall 163 of the bed 162 over the wheel well 164. The invention 100 is an insulated structure. The invention 100 comprises a thermal shell 101 and a storage insert 102. The thermal shell 101 forms the insulated exterior shell of the invention 100. The storage insert 102 is a rigid structure stored within the thermal shell 101. The storage insert 102 converts the interior space of the thermal shell 101 into a space suitable for use in storing hand tools or portable power tools 171 (hereinafter one or more tools).

The thermal shell 101 is a hollow insulating structure. The thermal shell 101 forms a thermally insulated storage space commonly referred to as a cooler. The superior 152 surface of the thermal shell 101 forms an open face that provides access into the hollow interior of the thermal shell 101. The thermal shell 101 is formed in the shape of a rectilinear block. The thermal shell 101 comprises a first compartment 111, a second compartment 112, and a barrier 113. The thermal shell 101 further comprises an interior arch 114. The thermal shell 101 is further defined with an inferior 151 direction, a superior 152 direction, an anterior 153 direction, a posterior 154 direction, a distal 155 direction, and a medial 156 direction. The thermal shell 101 bifurcates into the first compartment 111 and the second compartment 112.

The first compartment 111 is a thermally protected negative space formed within the invention 100. The first compartment 111 comprises a first chamber 121, a first lid 122, and a first one or more hinges 123. The first chamber 121 is the thermally insulated space within the first compartment 111. As shown most clearly in FIG. 6, with the exception of the barrier 113 the form factor of the first chamber 121 is geometrically similar to the form factor of a portion of the thermal shell 101. The superior 152 surface of the first chamber 121 is an open face. The first lid 122 is a door that forms a closure over the open face of the first chamber 121 to enclose the first chamber 121. The first lid 122 is an insulating structure. The first one or more hinges 123 attach the first lid 122 to the first chamber 121.

The second compartment 112 is a thermally protected negative space formed within the invention 100. The second compartment 112 comprises a second chamber 131, a second lid 132, and a second one or more hinges 133. The second chamber 131 is a thermally insulated space within the second compartment 112. As shown most clearly in FIG. 6, with the exception of the barrier 113 the form factor of the second chamber 131 is geometrically similar to the form factor of a portion of the thermal shell 101. The superior 152 surface of the second chamber 131 is an open face. The second lid 132 is a door that forms a closure over the open face of the second chamber 131 to enclose the second chamber 131. The second lid 132 is an insulating structure. The second one or more hinges 133 attach the second lid 132 to the second chamber 131.

In the first potential embodiment of the disclosure, the second chamber 131 is a mirror image of the first chamber 121 with the barrier 113 forming the plane of reflection.

The barrier 113 is a rectangular insulating structure that physically separates the first compartment 111 from the second compartment 112. The barrier 113 forms a boundary of the first compartment 111. The barrier 113 forms a boundary of the second compartment 112. The first compartment 111 and the second compartment 112 share the boundary formed by the barrier 113.

The interior arch 114 is a concave negative space formed in the inferior 151 surface of the thermal shell 101. The form factor of the interior arch 114 is geometrically similar to the form factor of the wheel well 164 of the pickup truck 161 such that the interior arch 114 will fit flush over the wheel well of the pickup truck 161 during the installation of the invention 100.

The storage insert 102 is a rigid structure that removably inserts into the thermal shell 101. As shown most clearly in FIG. 6, the form factor of the storage insert 102 is geometrically similar to a portion of the hollow interior of the thermal shell 101 such that the storage insert 102 will fit flush within the thermal shell 101. The purpose of the storage insert 102 is to store one or more tools 171 within the thermal shell 101. The storage insert 102 creates a protective surface between the one or more tools 171 and the interior surfaces of the thermal shell 101 to protect the thermal shell 101 from potential damage caused by the one or more tools 171. The storage insert 102 comprises an inner shell 141 and a plurality of storage chambers 142.

The inner shell 141 is a hollow metal rigid structure with which the one or more tools 171 are stored. The inner shell 141 protects the interior surfaces of the thermal shell 101 from damage by the one or more tools 171. The form factor of the inner shell 141 is geometrically similar to the form factor of the first chamber 121 such that the inner shell 141 inserts into the first chamber 121. The inner shell 141 inserts into the first chamber 121 such that the exterior of the inner shell 141 is flush with the interior surfaces of the first chamber 121. The form factor of the inner shell 141 is geometrically similar to the form factor of the second chamber 131 such that the inner shell 141 inserts into the second chamber 131. The inner shell 141 inserts into the second chamber 131 such that the exterior of the inner shell 141 is flush with the interior surfaces of the second chamber 131.

The plurality of storage chambers 142 are dividers installed within the hollow interior of the inner shell 141. The plurality of storage chambers 142 organizes the one or more tools 171 within the inner shell 141.

The following definitions and directional references were used in this disclosure:

Anterior: As used in this disclosure, anterior is a term that is used to refer to the front side or direction of a structure. When comparing two objects, the anterior object is the object that is closer to the front of the structure.

Arch: As used in this disclosure, an arch refers to an edge or surface that forms the concave edge or surface of a definable negative space.

Arch, Interior: As used in this disclosure, an interior arch is an arch formed in the perimeter surface of a volume wherein the interior arch forms a convex surface that faces the interior of the volume bounded by the perimeter.

Axle: As used in this disclosure, an axle is a cylindrical shaft that inserts through the center of one or more wheels such that the center axis of the one or more wheels and the center axis of the axle are aligned.

Concave: As used in this disclosure, concave is used to describe: 1) a surface that resembles the interior surface of a sphere; or, 2) a function with a curvature structure wherein a chord that connects any two points of the function will be lesser than (graphically below) or equal to the value of the function at any point along the chord.

Convex: As used in this disclosure, convex is used to describe: 1) a surface that resembles the outer surface of a sphere; or, 2) a function with a curvature structure wherein a chord that connects any two points of the function will be greater than (graphically above) or equal to the value of the function at any point along the chord.

Correspond: As used in this disclosure, the term correspond means that a first object is in some manner linked to a second object in a one to one relationship.

Distal: As used in this disclosure, the term distal is used to describe the relative location of two objects. The distal object is: 1) the object that is further from a previously specified center axis when the direction of comparison is the radial direction; and 2) the object that is further from a center point on a center axis when the direction of comparison is in the lateral direction.

Door: As used in this disclosure, a door is a movable or removable barrier attached to the wall of a room or the surface of a container to allow or prevent access through an aperture into the room or container.

Exterior: As used in this disclosure, the exterior is a relational term that implies that an object is not contained within the boundary of a structure or space.

Form Factor: As used in this disclosure, the term form factor refers to the size and shape of an object.

Flush: As used in this disclosure, the term flush is used to describe the alignment of a first surface and a second surface on a single plane.

Geometrically Similar: As used in this disclosure, geometrically similar is a term that compares a first object to a second object wherein: 1) the sides of the first object have a one to one correspondence to the sides of the second object; 2) wherein there is a proportional difference between each pair of corresponding sides is the same; 3) the angles formed by the first object have a one to one correspondence to the angles of the second object; and, 4) wherein the corresponding angles are equal.

Hand Tools or Portable Power Tools: As used in this disclosure, a hand tool or a portable power tool is considered to be a device that is classified, or would reasonably be expected to be classified, within the Cooperative Patent Classification system in the B25 grouping.

Hinge: As used in this disclosure, a hinge is a device that permits the turning, rotating, or pivoting of a first object relative to a second object.

Inferior: As used in this disclosure, the term inferior refers to a directional reference that is parallel to and in the same direction as the force of gravity.

Insulating Structure: As used in this disclosure, an insulating structure is a structure that inhibits, and ideally prevents, the transfer of heat through the insulating structure. Insulating structures may also be used to inhibit or prevent the transfer of sound through the insulating structure. Methods to form insulating structures include, but are not limited to: 1) the use of materials with low thermal conductivity; and, 2) the use of a structural design that places a vacuum within the insulating structure within the anticipated transfer path of the heat or sound.

Interior: As used in this disclosure, the interior is a relational term that implies that an object is contained within the boundary of a structure or space.

Lid: As used in this disclosure, a lid is a removable cover that is placed over an opening of a hollow structure to enclose the hollow structure.

Medial: As used in this disclosure, the term medial is used to describe the relative location of two objects. The medial object is: 1) the object that is closer to a previously specified center axis when the direction of comparison is the radial direction; and 2) the object that is closer to a center point on a center axis when the direction of comparison is in the lateral direction.

Mirror Image: As used in this disclosure, a mirror image refers to a second object that is a reproduction of a first object wherein the second object is identical to the first object except that the orientation of the second object is reversed relative to the first object as if the second object has been reflected by a plane of a mirror (often called the mirror plane or plane of reflection).

Negative Space: As used in this disclosure, negative space is a method of defining an object through the use of open or empty space as the definition of the object itself, or, through the use of open or empty space to describe the boundaries of an object.

One to One: When used in this disclosure, a one to one relationship means that a first element selected from a first set is in some manner connected to only one element of a second set. A one to one correspondence means that the one to one relationship exists both from the first set the second set and from the second set to the first set. A one to one fashion means that the one to one relationship exists in only one direction.

Orientation: As used in this disclosure, orientation refers to the positioning of a first object relative to: 1) a second object; or, 2) a fixed position, location, or direction.

Perimeter: As used in this disclosure, a perimeter is one or more curved or straight lines that bound an enclosed area on a plane or surface. The perimeter of a circle is commonly referred to as a circumference.

Pivot: As used in this disclosure, a pivot is a rod or shaft around which an object rotates or swings.

Posterior: As used in this disclosure, posterior is a term that is used to refer to the side of an object that is distal or in the opposite direction of the anterior side. When comparing two items, the posterior item is the item that is distal from the front of the object.

Radial: As used in this disclosure, the term radial refers to a direction that: 1) is perpendicular to an identified central axis; or, 2) projects away from a center point. Rectilinear: As used in this disclosure, rectilinear is an adjective that is used to describe an object that: 1) moves in a straight line or lines; 2) consists of a straight line or lines; 3) is bounded by a straight line or lines; or, 4) is otherwise characterized by a straight line or lines.

Rectilinear Block: As used in this disclosure, a rectilinear block refers to a three-dimensional structure comprising a plurality of rectangular surfaces. Rectilinear blocks are similar to rectangular blocks and are often used to create a structure with a reduced interior volume relative to a rectangular block. Within this disclosure, a rectilinear block may further comprise rounded edges and corners.

Rigid Structure: As used in this disclosure, a rigid structure is a solid structure that is inflexible and will not deform significantly before failing under a force.

Rounded: A used in this disclosure, the term rounded refers to the replacement of an apex, vertex, or edge or brink of a structure with a (generally smooth) curvature wherein the concave portion of the curvature faces the interior or center of the structure.

Shell: As used in this disclosure, a shell is a structure that forms an outer covering intended to contain an object. Shells are often, but not necessarily, rigid or semi-rigid structures that are intended to protect the object contained within it.

Superior: As used in this disclosure, the term superior refers to a directional reference that is parallel to and in the opposite direction of the force of gravity.

Pickup Truck: As used in this disclosure, a pickup truck is a vehicle having an enclosed cab and an open body comprising low sides and a tailgate that is powered by an internal combustion engine.

Vehicle: As used in this disclosure, a vehicle is a motorized device used for transporting passengers, goods, or equipment. The term motorized vehicle refers to a vehicle can move under power provided by an electric motor or an internal combustion engine.

Wheel: As used in this disclosure, a wheel is a circular object that revolves around an axle or an axis and is fixed below an object to enable it to move easily over the ground. For the purpose of this disclosure, it is assumed that a wheel can only revolve in a forward and a backward direction. Wheels are often further defined with a rim and spokes. Spokes are also commonly referred to as a wheel disk.

The directional references used in this disclosure correspond to the directional references from the perspective of the vehicle. The front is the side of the vehicle proximal to the normal direction of travel. The rear side is the side of the vehicle that is distal from the front. The inferior side is the side of the vehicle that is closest to the ground. The superior side of the vehicle is the side of the vehicle that is distal to the inferior side. The left side is to the left side of a person facing the direction of normal, or forward travel. The right side is the side of the vehicle that is distal from the left side. The terms distal and medial refer to a hypothetical line drawn from the center point of the front axle to the center point of the rear axle. When comparing a first object to a second object, the first object is said to be the distal object if the span of the perpendicular distance from the first object the hypothetical line is greater than the span of the perpendicular distance from the second object to the hypothetical line. A first object is said to be the medial object if the span of the perpendicular distance from the first object the hypothetical line is less than the span of the perpendicular distance from the second object to the hypothetical line.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. An arrangement for holding articles comprising:
   a thermal shell and a storage insert;
   wherein the storage insert is stored within the thermal shell;
   wherein the arrangement for holding articles is a storage chest;
   wherein the arrangement for holding articles is configured for use with a pickup truck;
   wherein the pickup truck is further defined with a bed, a sidewall, and a wheel well;
   wherein the arrangement for holding articles is configured to mount by the sidewall of the bed over the wheel well;
   wherein the arrangement for holding articles is an insulated structure;
   wherein the storage insert converts the interior space of the thermal shell into a space suitable for use in storing one or more tools;
   wherein the thermal shell is a hollow insulating structure;
   wherein a superior surface of the thermal shell forms an open face that provides access into the hollow interior of the thermal shell;
   wherein the thermal shell is formed in the shape of a substantially rectilinear block;
   wherein the storage insert is a rigid structure that removably inserts into the thermal shell;
   wherein the storage insert stores the one or more tools within the thermal shell;
   wherein the storage insert creates a protective surface between the one or more tools and the interior surfaces of the thermal shell;
   wherein the thermal shell comprises a first compartment, a second compartment, and a barrier;
   wherein the barrier is shared between the first compartment and the second compartment;
   wherein the thermal shell bifurcates into the first compartment and the second compartment.

2. The arrangement for holding articles according to claim 1
   wherein the first compartment is formed within the thermal shell;
   wherein the second compartment is formed within the thermal shell;
   wherein the first compartment is thermally protected.

3. The arrangement for holding articles according to claim 2
   wherein the first compartment comprises a first chamber, a first lid, and a first one or more hinges;
   wherein the first one or more hinges attach the first lid to the first chamber;
   wherein the first chamber is the thermally protected space within the first compartment.

4. The arrangement for holding articles according to claim 3
   wherein a form factor of a portion of the first chamber is geometrically similar to a form factor of a portion of the thermal shell.

5. The arrangement for holding articles according to claim 4 wherein the superior surface of the first chamber is an open face.

6. The arrangement for holding articles according to claim 5
   wherein the first lid forms a closure over the open face of the first chamber;
   wherein the first lid is an insulating structure.

7. The arrangement for holding articles according to claim 6 wherein the second compartment is thermally protected.

8. The arrangement for holding articles according to claim 7
   wherein the second compartment comprises a second chamber, a second lid, and a second one or more hinges;
   wherein the second one or more hinges attach the second lid to the second chamber;
   wherein the second chamber is the thermally protected space within the second compartment.

9. The arrangement for holding articles according to claim 8 wherein a form factor of a portion of the second chamber is geometrically similar to a form factor of a portion of the thermal shell.

10. The arrangement for holding articles according to claim 9, wherein a superior surface of the second chamber is an open face.

11. The arrangement for holding articles according to claim 10
    wherein the second lid forms a closure over the open face of the second chamber;
    wherein the second lid is an insulating structure.

12. The arrangement for holding articles according to claim 11
    wherein the barrier is a rectangular insulating structure;
    wherein the barrier physically separates the first compartment from the second compartment;
    wherein the barrier forms a boundary of the first compartment;
    wherein the barrier forms a boundary of the second compartment;
    wherein the first compartment and the second compartment share the boundary formed by the barrier.

13. The arrangement for holding articles according to claim 12
    wherein the second chamber is a mirror image of the first chamber;

wherein the barrier forms the plane of reflection between the first chamber and the second chamber.

14. The arrangement for holding articles according to claim 13
wherein the thermal shell further comprises an interior arch;
wherein the interior arch is formed in the inferior surface of the thermal shell;
wherein the form factor of the interior arch is geometrically similar to the form factor of the wheel well of the pickup truck such that the interior arch will fit flush over the wheel well.

15. The arrangement for holding articles according to claim 14
wherein the storage insert comprises an inner shell and a plurality of storage chambers;
wherein the plurality of storage chambers are dividers;
wherein the plurality of storage chambers are installed within the inner shell.

16. The arrangement for holding articles according to claim 15 wherein the inner shell is a hollow metal rigid structure.

17. The arrangement for holding articles according to claim 16
wherein the form factor of the inner shell is geometrically similar to the form factor of the first chamber such that the inner shell inserts into the first chamber;
wherein the inner shell inserts into the first chamber such that the exterior of the inner shell is flush with the interior surfaces of the first chamber.

18. The arrangement for holding articles according to claim 17
wherein the form factor of the inner shell is geometrically similar to the form factor of the second chamber such that the inner shell inserts into the second chamber;
wherein the inner shell inserts into the second chamber such that the exterior of the inner shell is flush with the interior surfaces of the second chamber.

* * * * *